(12) United States Patent
Enokida et al.

(10) Patent No.: US 7,127,472 B1
(45) Date of Patent: Oct. 24, 2006

(54) DATA PROCESSING METHOD AND DATA PROCESSING DEVICE

(75) Inventors: Miyuki Enokida, Yokohama (JP); Kiyoshi Kusama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/558,656

(22) Filed: Apr. 26, 2000

(30) Foreign Application Priority Data

Apr. 27, 1999 (JP) ................................. 11-120713
Apr. 11, 2000 (JP) ............................ 2000-109923

(51) Int. Cl.
*G06F 17/30* (2006.01)

(52) U.S. Cl. .............................. 707/103 Y; 707/104.1; 707/101

(58) Field of Classification Search .................... 707/1, 707/3, 10, 101, 4, 7, 104.1, 103 Y, 103 Z
See application file for complete search history.

(56) References Cited

U.S. PATENT DOCUMENTS

| | | | | |
|---|---|---|---|---|
| 5,412,641 A | | 5/1995 | Shinjo et al. ................ 369/126 |
| 5,457,793 A | * | 10/1995 | Elko et al. ................... 707/205 |
| 5,530,856 A | * | 6/1996 | Dahod et al. ............ 707/104.1 |
| 5,579,516 A | * | 11/1996 | Van Maren et al. ............ 707/1 |
| 5,613,108 A | * | 3/1997 | Morikawa ................... 707/200 |
| 5,745,907 A | | 4/1998 | Yamamoto ................... 707/502 |
| 5,930,709 A | * | 7/1999 | Park et al. ..................... 707/10 |
| 5,937,409 A | * | 8/1999 | Wetherbee ..................... 707/1 |
| 5,987,506 A | * | 11/1999 | Carter et al. ................... 707/10 |
| 6,009,439 A | * | 12/1999 | Shiomi et al. ........... 707/104.1 |
| 6,105,022 A | * | 8/2000 | Takahashi et al. .............. 707/1 |
| 6,145,119 A | | 11/2000 | House et al. ................... 717/1 |
| 6,208,999 B1 | * | 3/2001 | Spilo et al. .................. 707/202 |
| 6,327,590 B1 | * | 12/2001 | Chidlovskii et al. ......... 128/922 |
| 6,463,444 B1 | * | 10/2002 | Jain et al. ................ 707/104.1 |
| 6,490,683 B1 | * | 12/2002 | Yamada et al. ............. 713/176 |
| 6,513,038 B1 | * | 1/2003 | Hasegawa et al. ............. 707/7 |
| 6,714,946 B1 | * | 3/2004 | Kanai et al. ............. 707/104.1 |
| 7,085,767 B1 | * | 8/2006 | Kusama ..................... 707/101 |

OTHER PUBLICATIONS

Kim et al. TA-RE: an exchange language for mining software repositories, International Conference on Software repositories, 1996, p. 22-25.*
U.S. Appl. No. 09/558,655, filed Apr. 26, 2000.

* cited by examiner

*Primary Examiner*—Leslie Wong
*Assistant Examiner*—Baoquoc N. To
(74) *Attorney, Agent, or Firm*—Fitzpatrick, Cella, Harper & Scinto

(57) ABSTRACT

A data processing device first reads directory data provided for each directory by a file management system which manages files using a directory structure. When meta-data to be attached to the directory data is written in proper XML format, the device appends the meta-data to the end of the read directory data, and outputs the entirety of the data obtained thereby as a directory data file. By appending the meta-data to the end of the directory data in this way, meta-data can be registered by directory with respect to existing data managed by the directory, without affecting existing applications.

10 Claims, 17 Drawing Sheets

FIG. 12

DIRECTORY DATA

```
<?xml version="1.0"?>
<PhotoXML>
  <When>Summer</When>
  <Event>Zoo</Event>
  <Loc>Ueno</Loc>
</PhotoXML>
```

1801

META-DATA

```
<?xml version="1.0"?>
<PhotoXML>
  <KW>Elephant</KW>
  <KW>Water</KW>
  <Event>Zoo</Event>
</PhotoXML>
```

1802

META-DATA PREPARED

```
<?xml version="1.0"?>
<PhotoXML>
<When>Summer</When>
  <Event>Zoo</Event>
  <Loc>Ueno</Loc>
  <KW>Elephant</KW>
  <KW>Water</KW>
</PhotoXML>
```

LIST 1

```
<Filename>img001.jpg</Filename>
<PhotoXML>
  <When>Summer</When>
  <Event>Zoo</Event>
  <Loc>Ueno</Loc>
  <KW>elephant</KW>
</PhotoXML>
<Filename>img002.jpg</Filename>
<PhotoXML>
  <When>Summer</When>
  <Event>Zoo</Event>
  <Loc>Ueno</Loc>
  <KW>giraffe</KW>
</PhotoXML>
<Filename>img003.jpg</Filename>
<PhotoXML>
  <When>Summer</When>
  <Event>Zoo</Event>
  <Loc>Ueno</Loc>
  <KW>monkey</KW>
</PhotoXML>
```

501

DIRECTORY META GENERATED

```
<PhotoXML>
  <When>Summer</When>
  <Event>Zoo</Event>
  <Loc>Ueno</Loc>
<PhotoXML>
```

502

DATA PROCESSING METHOD AND DATA PROCESSING DEVICE

FIELD OF THE INVENTION

The present invention relates to a data processing method and data processing device for registering meta-data in and distinguishing meta-data from data.

BACKGROUND OF THE INVENTION

Meta-data is "data about data," and is used as data which explains binary data such as video data or audio data. However, when binary data and meta-data corresponding thereto exist in separate files, when moving or copying files, the user must simultaneously manage the binary data and the meta-data, which is very troublesome.

For this reason, in order to simplify management of binary data and meta-data, various methods of writing binary data and meta-data have conventionally been proposed. This type of conventional art can be divided into methods which stipulate a new binary format, and methods of managing in a database.

First, examples of methods which stipulate a new binary format include, for image data, Tiff, Exif, and Flashpix. FIG. 16 schematically shows a format which incorporates meta-data into binary data. Binary data is, for example, image data. A typical method of incorporating meta-data into binary data, as shown in FIG. 16, is to provide in the header portion of the image data a domain for writing meta-data, into which the user writes the meta-data. Writing meta-data in this way facilitates data searching and classification. Further, since the meta-data is included in the binary data, both can be managed as a single file, making file management comparatively easier.

Next, a method of managing binary data and meta-data in a database will be explained. FIG. 17 schematically shows a method of managing binary data and meta-data in a database. Methods like that shown in FIG. 17, which use a database, etc. to manage binary data and meta-data existing as separate files, are widely used. These methods have the advantage that existing binary data can be used as is in existing applications.

It is also commonly known that a directory structure can be used in file management. Accordingly, when, for example, managing a large number of binary data files, all of the binary data files are usually not placed in a single directory, but a plurality of sub-directories are created, one for each group of binary data files sharing a certain affiliation or characteristic. In this case, the meta-data for all of the binary data files in a given sub-directory have an item in common. However, at present, each binary data file exists separately, and meta-data is managed by one of the two methods discussed above.

Both methods which stipulate a new format for writing meta-data and methods which manage meta-data using a database have their respective problems.

First, when a new format for writing meta-data is stipulated, existing binary data must be converted into that new format, and then the meta-data written into the new format. Further, in order to use the meta-data in the new format for searching, applications compatible with the new format are necessary. In other words, the drawback of this method is that writing and using the meta-data require a very large number of steps and a special environment. In addition, in order to process binary data in the new format (in the case of image data, to replay the image, for example), applications compatible with the new data format are necessary, and existing applications cannot be used.

Moreover, since the method of writing the meta-data is uniquely determined by the new format, a further problem is that in order to prepare an application which uses meta-data in the new format, it is necessary to create new routines for searching the meta-data. In addition, the prescribed format must be changed in order to write meta-data in a new domain.

On the other hand, when using a database to simultaneously manage binary data and meta-data, meta-data cannot be recorded or used without database software. Further, special software is also necessary to display recorded meta-data. In addition, when binary data is taken out of the database, it is not accompanied by the corresponding meta-data, and becomes binary data without meta-data.

When using a directory structure to manage binary data files, as well, the meta-data for binary data files in a given directory exist for each binary data file, and are managed as separate files. Consequently, even when a plurality of binary data files share an item in common, each binary data file is managed independently, thus increasing the data quantity of meta-data which must be managed. Further, when changing an item in common, meta-data for each binary data file changed must also be changed.

SUMMARY OF THE INVENTION

The present invention was created in view of the foregoing problems relating to writing and searching meta-data, and it is an object hereof to enable registration of meta-data in directory data without influencing existing applications.

Another object of the present invention is to use a typical data writing language to write meta-data, thus enabling the use of existing tools compatible with typical data writing languages, and facilitating the development of compatible applications.

A further object of the present invention is to enable meta-data written in directory data to be extracted therefrom and provided for processing such as searching, reference, and modification.

A further object of the present invention is to register meta-data in a directory, thereby contributing to simplification of management of meta-data and reduction of data quantity thereof.

A further object of the present invention is to enable simple attachment of meta-data to data files grouped by a certain affiliation or characteristic and managed by a directory.

In order to attain the foregoing objects, in one embodiment of the present invention, meta-data is registered in directory data. By registering meta-data in directory data, it becomes unnecessary to attach meta-data to each of the files under that directory, and change of the contents thereof is also simplified.

A further object of the present invention is to prevent meta-data registered in a directory from being lost or wasted when a file is moved or copied from that directory.

A further object of the present invention is to enable suitable meta-data to be attached to a directory even when meta-data is already registered in each binary data.

A further object of the present invention is to expedite searching by extracting suitable meta-data from a data file with meta-data registered therein, and registering that meta-data in directory data.

A further object of the present invention is to simply group data files in directories by certain affiliations or characteristics.

Other features and advantages of the present invention will be apparent from the following description made in conjunction with the accompanying drawings, in which like reference symbols designate the same or similar members throughout the figures thereof.

BRIEF DESCRIPTION OF THE DRAWINGS

The accompanying drawings, which are incorporated in and constitute a part of the Specification, illustrate embodiments of the present invention and, together with the description, serve to explain the principles of the invention.

FIG. 12 is a drawing explaining an example of a method for comparing and synthesizing meta-data and directory data according to the third embodiment.

FIG. 15 is a drawing showing an example of automatic generation of directory meta-data from a list of meta-data according to the fourth embodiment.

DETAILED DESCRIPTION OF THE PREFERRED EMBODIMENTS

Preferred embodiments of the present invention will now be described in detail with reference to the accompanying drawings.

First Embodiment

Figure 1:
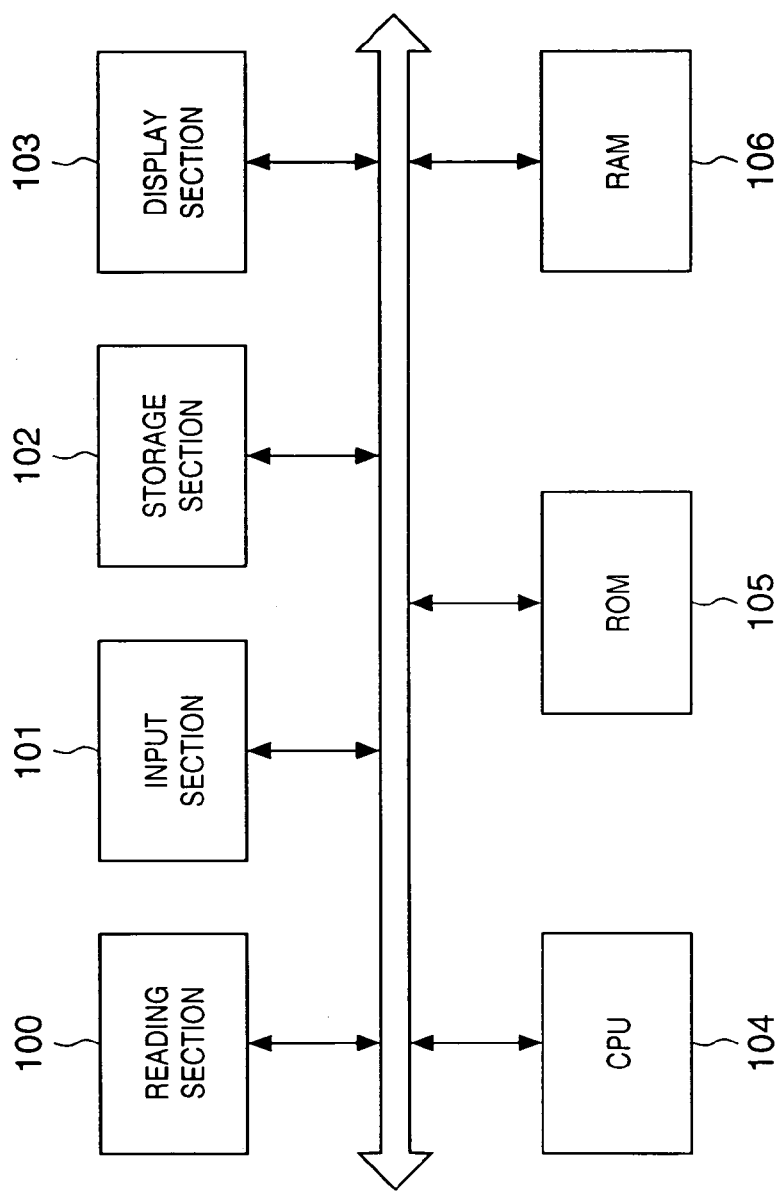
FIG. 1 is a block diagram showing the structure of a data processing device according to a first embodiment of the present invention.

FIG. 1 is a block diagram showing the structure of a data processing device according to the first embodiment of the present invention. In FIG. 1, 100 is a reading section, which reads an image using a scanner, for example. 101 is an input section, which inputs instructions from the user, data, etc., and which includes a keyboard, a pointing device, etc. 102 is a storage section, which stores binary data, meta-data, etc. in a directory structure. A hard disk is typically used as the storage section 102. 103 is a display section, which displays binary data accumulated in the storage section 102, and displays image data read by the reading section 100. A CRT, liquid crystal display device, etc. is typically used as the display section 103.

Figure 2:
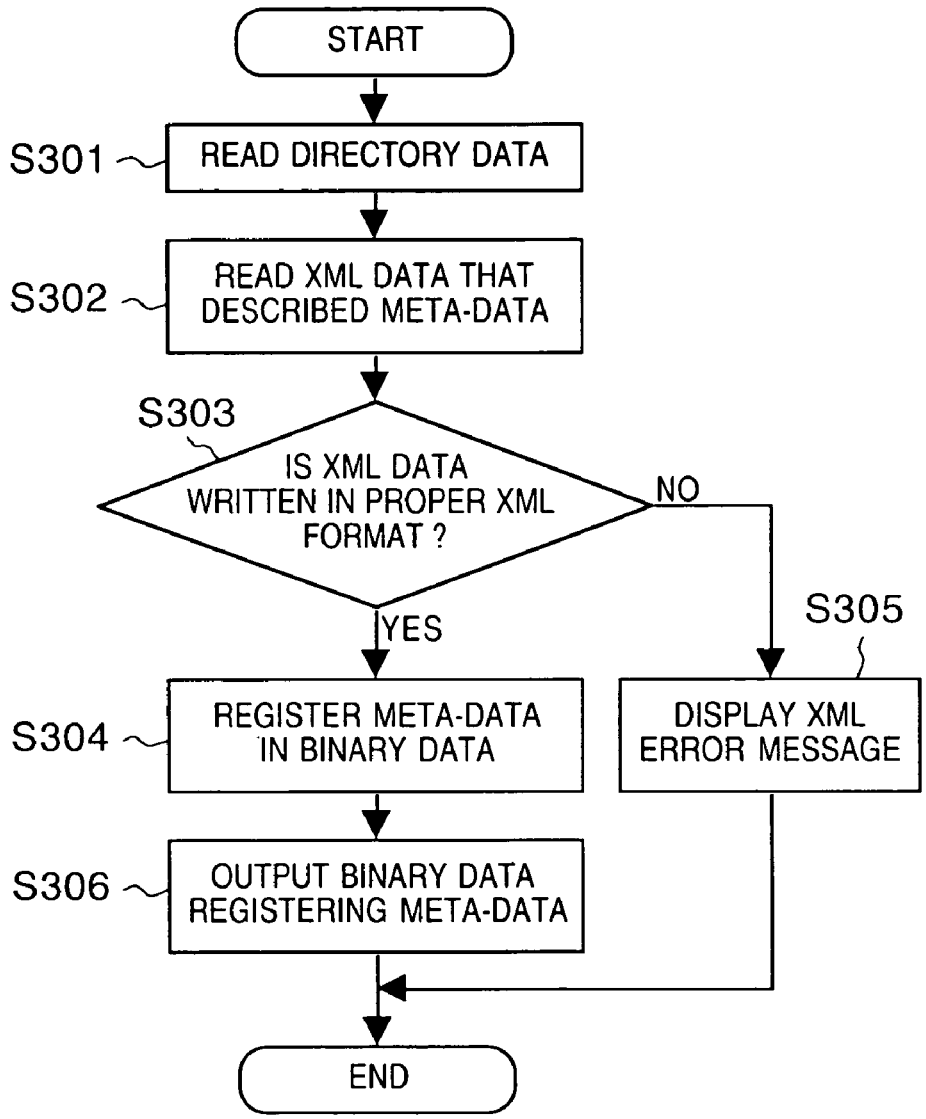
FIG. 2 is a flow chart explaining meta-data registration processing according to the first embodiment.

104 is a CPU, which is involved in all processing of the respective structures above, and a ROM 105 and a RAM 106 provide to the CPU 104 programs, data, and/or operating domains necessary in this processing. Here, a control program for realizing the processing steps of the present embodiment, to be explained below with reference to the flow chart in FIG. 2, is also stored in the ROM 105. A structure in which this control program is stored in the storage section 102 and loaded into the RAM 106 for execution by the CPU 104 is also possible.

Incidentally, a data processing device according to the present embodiment is provided with various structural elements in addition to those discussed above, but these are not the principal object of the present invention, and accordingly explanation thereof will be omitted here.

The following will explain processing for registering meta-data in directory data using a data processing device structured as above. FIG. 2 is a flow chart explaining meta-data registration processing according to the present embodiment.

In FIG. 2, first, in step S301, directory data of a directory indicated by the user is read into memory (into the RAM 106). This is accomplished by, for example, inputting the name of a desired directory through the keyboard, or indicating the directory using a pointing device (such as a mouse). Next, in step S302, an XML file which records meta-data, indicated by the user, is read into memory (into the RAM 106). The XML file is also indicated by inputting the file name through the keyboard, indicating a corresponding icon using a pointing device (such as a mouse), etc.

Next, in step S303, it is investigated whether the XML file recording meta-data is XML data of the proper format. In making this determination of proper format, it is checked whether the format for writing an XML file is satisfied (for example, whether or not the brackets at the left and right of each tag form pairs, whether the form of tagging is correct, etc.). This determination of whether or not the XML data has the proper format may also include a check of whether it is valid XML data. Here, this determination of whether it is valid XML data may be accomplished by, for example, checking whether or not the XML data is written in accordance with a schemer such as DTD (Document Type Definition).

If it is determined in step S303 that the XML data does not have the proper format, processing proceeds to step S307. In step S307, a message to the effect that there was an error in the XML data is displayed on the display section 103, and processing ends.

If, on the other hand, it was determined in step S303 that the XML file was XML data in the proper format, processing proceeds to step S304. Instep S304, the meta-data is appended to the end of the directory data read into memory in step S301, thereby registering the meta-data. Then, in step S306, the directory data registering the meta-data is outputted, and processing ends. By means of the output in step S306, directory data with meta-data attached thereto, having the data structure shown in FIG. 3, is stored in the storage section 102 as a single directory data file.

Figure 3:
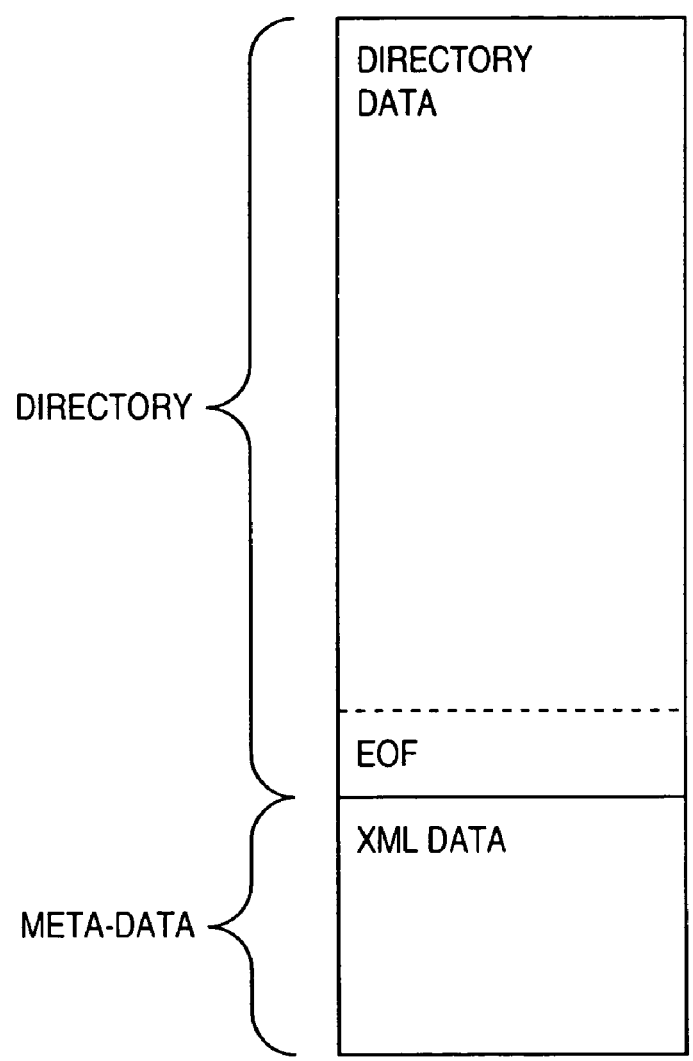
FIG. 3 is a drawing explaining registration of meta-data in directory data according to the first embodiment.

FIG. 3 is a drawing explaining registering of meta-data in directory data according to the present embodiment. As shown in FIG. 3, meta-data written in XML data format is appended to the end of the directory data (in the present example, after the identifier <EOF> indicating the end of the directory data). In this way, the meta-data can be registered in the directory data without influencing other applications. Specifically, in referring to directory data, typical applications only use data from the beginning of the directory data to the final identifier, and thus the meta-data appended thereafter does not affect the application.

Further, since the meta-data is written in XML format, by extracting this XML data portion, it is possible to add to, change, or refer to the meta-data using tools which understand XML data. Thus the present invention is superior in wide applicability. Incidentally, extraction of an XML data portion will be explained in detail in the second embodiment below.

As discussed above, in the present embodiment, by writing meta-data in XML format and appending this XML data to the end of directory data, meta-data can be registered in existing directory data, without influencing existing applications.

Second Embodiment

The first embodiment above explained a method of registering meta-data in directory data to create a directory data file. The present second embodiment will explain processing for distinguishing whether or not meta-data is registered in a directory data file, and when it is registered, for extracting the meta-data. Here, a data processing device according to the present second embodiment is structured as that of the first embodiment above, and accordingly explanation thereof will be omitted.

Figure 4:
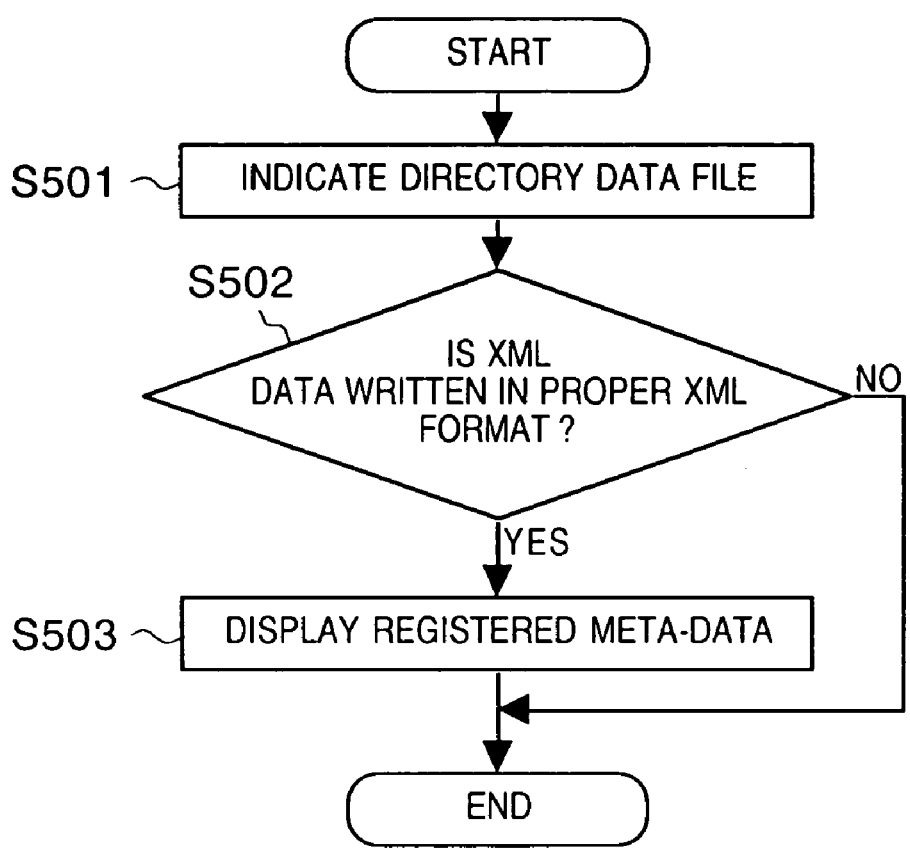
FIG. 4 is a flow chart showing steps for distinguishing and extracting registered meta-data according to a second embodiment of the present invention.

The following will explain determination of whether meta-data registered in the manner explained in the first embodiment above is present in the directory data file of an indicated directory, and operations for extracting the registered meta-data. FIG. 4 is a flow chart showing steps for distinguishing and extracting registered meta-data according to the present second embodiment. Incidentally, in the present embodiment, the extracted meta-data is displayed on the display section 103, but the form of output is not limited to this. It will be evident to one skilled in the art that other structures are also possible, such as one which provides the extracted meta-data for editing or search processing.

As shown in FIG. 4, first, in step S501, the user indicates a directory data file for which it is to be determined whether or not meta-data is registered therein, i.e., data for processing. In step S501, indication of the data for processing is accomplished by, for example, inputting the file name of a directory data file through the keyboard, or indicating a corresponding icon using a pointing device (such as a mouse).

Figure 5:
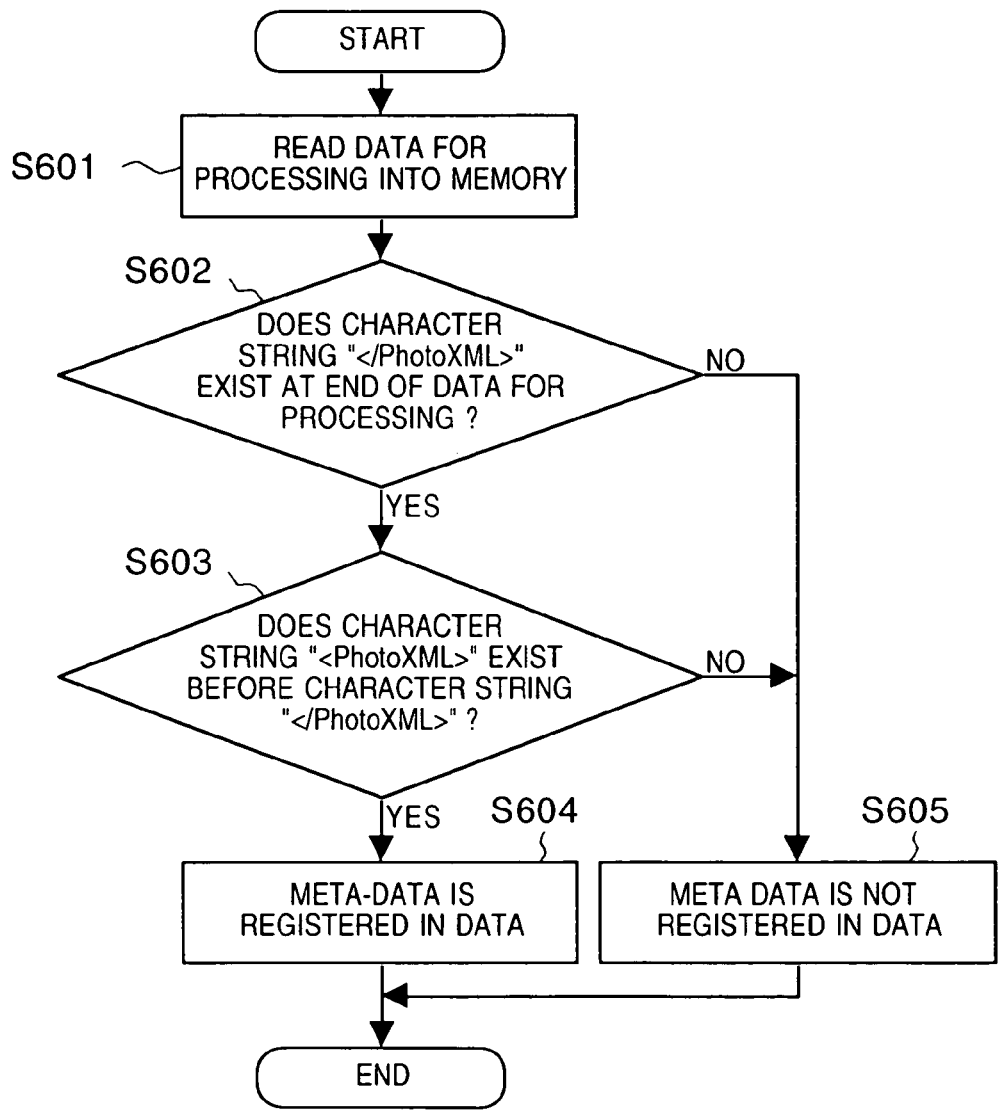
FIG. 5 is a flow chart explaining the details of processing for distinguishing meta-data according to the second embodiment.

Next, in step S502, it is determined whether or not meta-data written in the XML format is registered in the data of the indicated directory data file. Here, the details of the determination processing in step S502 will be explained with reference to the flow chart in FIG. 5 and the explanatory drawing in FIG. 6. FIG. 5 is a flow chart explaining the details of processing for distinguishing meta-data according to the present embodiment. Further, FIG. 6 is a drawing showing an example of data structure of directory data which registers XML data as meta-data.

Figure 6:
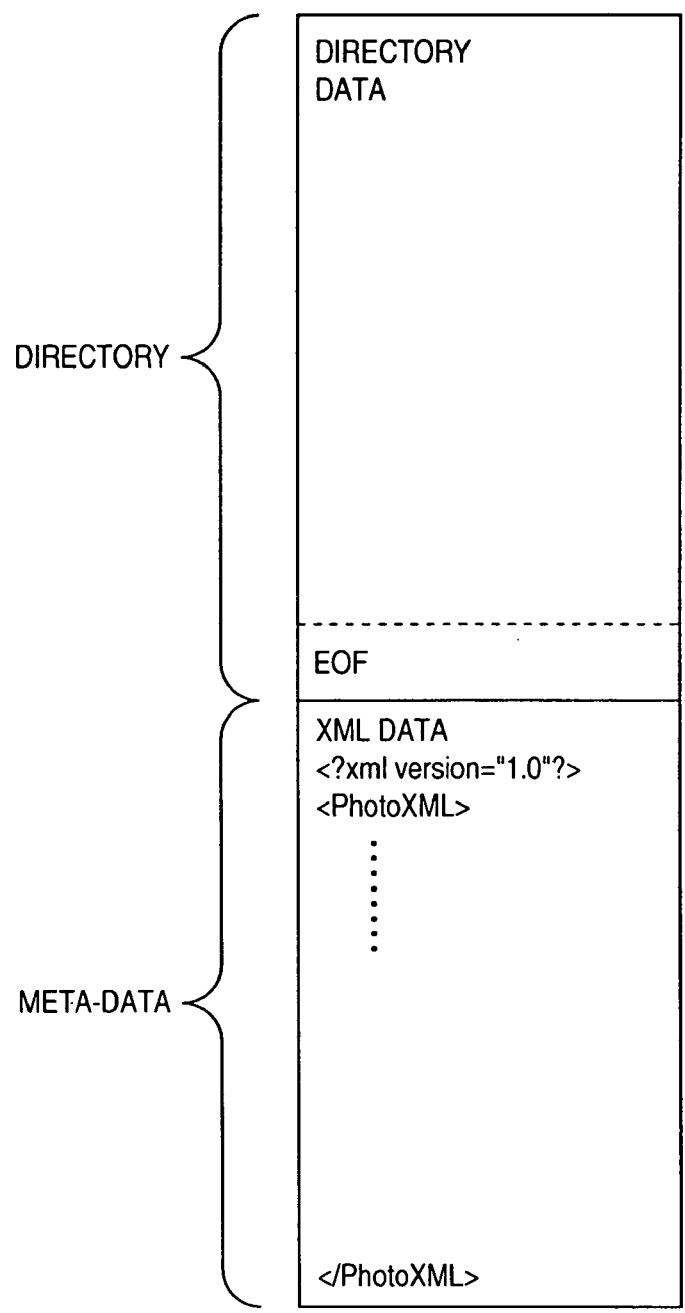
FIG. 6 is a drawing showing an example of data structure of directory data with XML data registered therein as meta-data.

As was explained in the first embodiment above, the data structure of a directory data file (data for processing) with XML data as meta-data registered therein, is as shown in FIG. 6. Accordingly, distinguishing the presence or absence of meta-data is performed as follows.

As shown in FIG. 5, first, in step S601, the entirety of the data of the directory data file (the entirety of the data for processing) indicated in step S501 is read into memory (into the RAM 106). Since the data outputted in step S306 in the first embodiment above is managed as a single file, the entirety of the data can be read out using a file managing system.

Next, in step S602, it is checked whether the character string "</PhotoXML>" is present at the end of the data read in step S601. If this character string is not present, processing proceeds to step S605.

If the character string "</PhotoXML>" was present at the end of the data for processing, processing proceeds to step S603, where it is determined whether the character string "</PhotoXML>" is preceded by a character string "<PhotoXML>". If in step S603 the character string "<PhotoXML>" was found, processing proceeds to step S604, where it is concluded that meta-data is registered in the data for processing, and processing ends. If, on the other hand, the character string "<PhotoXML>" was not found, processing proceeds to step S605, where it is concluded that no meta-data is registered in the data for processing. In other words, if the character string "</PhotoXML>" is not found in step S602, or if the character string "<PhotoXML>" is not found in step S603, processing proceeds to step S605, where it is concluded that no meta-data is registered in the data for processing.

Incidentally, in step S603, after finding the character string "<PhotoXML>", it is possible to confirm whether the data bracketed by the two foregoing character strings is written in proper XML format. Further, in this case, it is also possible to perform determination of whether the data is valid XML data. Here, this determination of proper format and of valid data are as explained in the first embodiment above (step S303).

The following explanation returns to the flow chart in FIG. 4. When it was concluded in the processing shown in the flow chart in FIG. 5 that meta-data is registered in the data for processing, processing proceeds to step S503. In step S503, based on the XML data bracketed by the character strings "<PhotoXML>" and "</PhotoXML>", the meta-data is displayed on the display section 103, and processing ends. If, on the other hand, it was determined in step S502 that there is no meta-data registered in the data for processing, processing ends.

As explained above, in the present embodiment, it is possible to distinguish directory data with meta-data recorded therein from normal directory data based on rules for writing XML data, and, when directory data recording meta-data is distinguished, to display the meta-data.

In other words, in the present embodiment, it is possible to distinguish directory data which registers meta-data from directory data which does not register meta-data, and to extract the registered meta-data. Accordingly, if an existing data writing language is used for the meta-data, it is possible to, for example, edit, refer to, or search the meta-data using existing tools for that data writing language, thus saving the effort of developing new tools.

Figure 7:
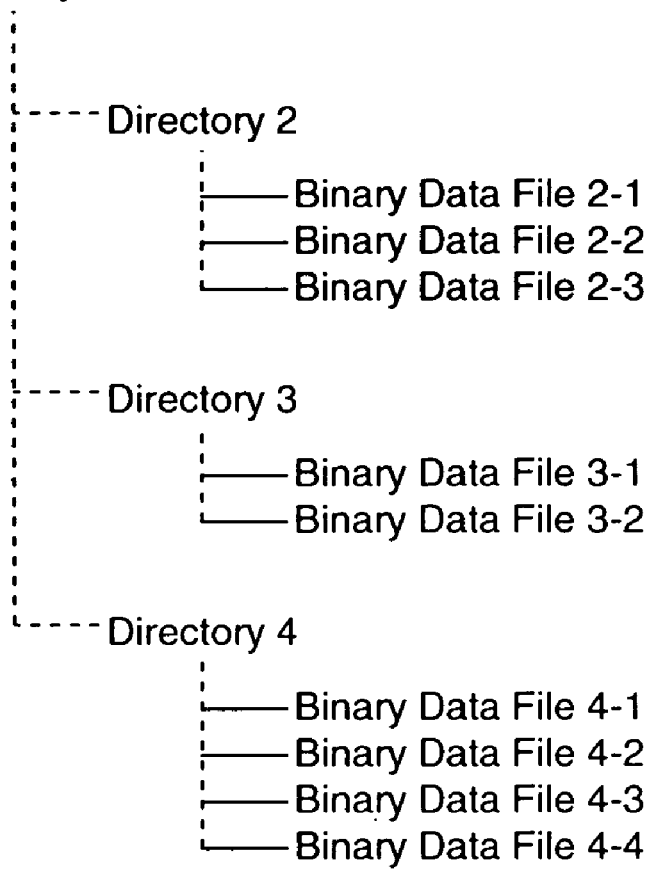
FIG. 7 is a drawing explaining an example of a directory structure according to the second embodiment.

Next, a method of storing meta data for binary data files stored by directory will be explained in concrete terms with reference to FIG. 7. For ease of explanation, assume that, as shown in FIG. 7, a root directory Directory 1 contains three sub-directories Directory 2, Directory 3, and Directory 4, each of which contains binary data files.

In such a case, if meta-data is registered in the directory data of each directory, common meta-data is stored for the Binary Data Files 2-1 through 2-3 in Directory 2, common meta-data is stored for the Binary Data Files 3-1 and 3-2 in Directory 3, and common meta-data is stored for the Binary Data Files in Directory 4.

If the binary data files contain, say, image data recorded using a digital camera, a simple example of meta-data would be information indicating that the binary data in Directory 2 was recorded on March 10, and the binary data in Directory 3 was recorded on March 11. Alternatively, it is also possible to divide into directories based on some sort of affiliation, such as "Scenery" or "People." In any case, the items, contents, etc. stored in the meta-data can be determined by the manner in which data files are divided at the time of creating the sub-directories.

In the case above, meta-data is not stored in each binary data file, but in the directory data of each sub-directory. Accordingly, an application reading a binary data file will read out the meta-data attached to the directory the binary data file belongs to, and process this as meta-data for the binary data file.

For example, in order to search for a binary data file by a certain item stored in the meta-data, in the present embodiment, since the meta-data attached to the directory data is effective for all of the binary data files belonging to that directory, it is sufficient to merely search the directories, making it possible to perform search processing rapidly.

Incidentally, in the foregoing explanation, the data stored in the directories was binary data, but it may of course be any type of data.

[Revision of Directory Data by File System]

When files are added to or removed from a directory the file system revises the directory data in accordance with this processing. However, if the directory data is revised with the meta-data attached, the meta-data is destroyed. Accordingly, in order to handle directory data to which meta-data has been attached as explained in the first embodiment above, slight changes to the file system are necessary. The following will explain processing for revision of directory data by the file management system.

Figure 8:
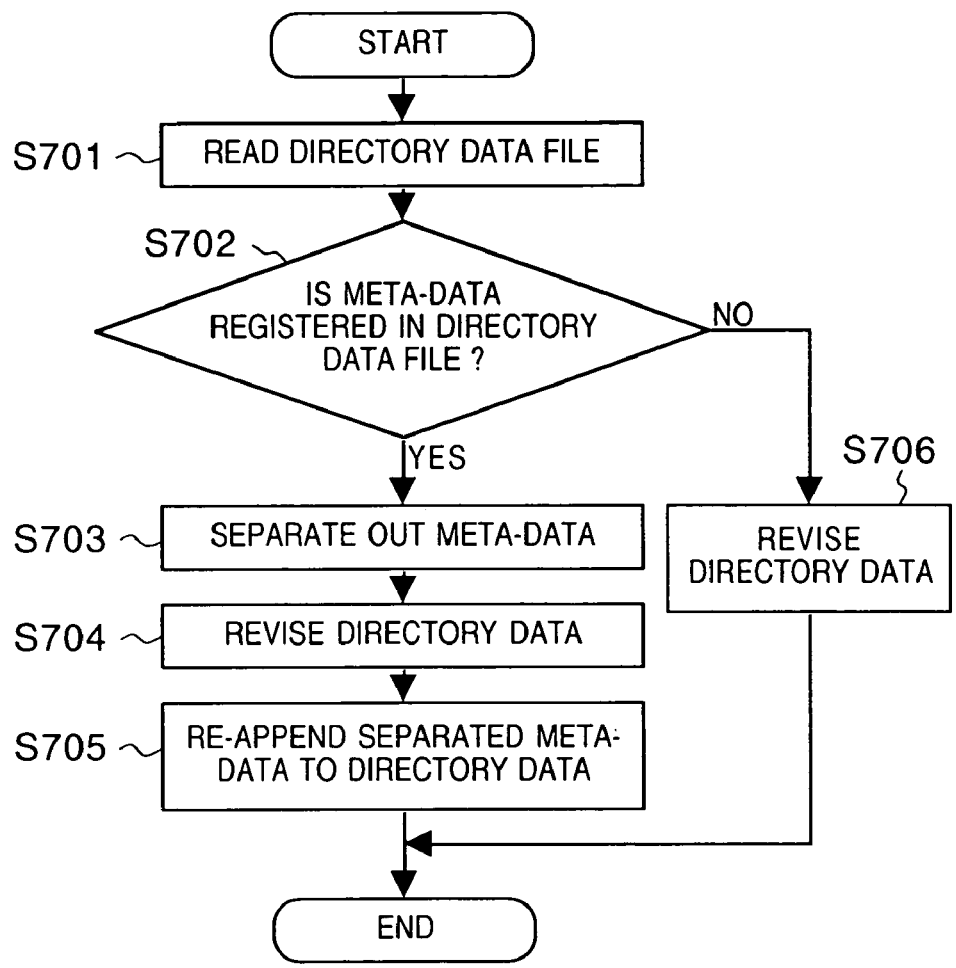
FIG. 8 is a flow chart explaining processing for revising directory data according to the second embodiment.

FIG. 8 is a flow chart explaining processing for revising directory data according to the present embodiment. If a file is added to the directory, or if a file in the directory is revised or deleted, the processing shown in FIG. 8 is carried out.

First, in step S701, the directory data file of the directory in question is read out. Then, in step S702, it is determined whether meta-data is attached to the directory data. This determination can be performed according to the steps shown in FIG. 5 discussed above. Then, if it is determined that meta-data is registered in the directory data, processing proceeds to step S703.

In step S703, the detected meta-data is separated from the directory data and stored out of harm's way in a separate memory area. Next, in step S704, the directory data left after separation of the meta-data is edited in the same manner as conventionally. Then, after editing of the directory data is completed, in step S705, the meta-data separated from the directory data in step S703 is re-appended to the end of the revised directory data. If on the other hand it was found in step S702 that there is no meta-data registered in the directory data, processing proceeds to step S706, and the directory data is revised straightaway.

In the foregoing processing, processing for revising the directory data in steps S704 and S706 may be equivalent to processing executed by conventional file managing systems. Accordingly, it will be evident to one skilled in the art that the required conversion of conventional file management systems is not a major matter, and that with only minor changes they can be enabled to handle directory files according to the present embodiment.

As discussed in the first and second embodiments above, in the present invention, since meta-data is registered in directory data, meta-data can be registered and managed by directory.

Further, with the present invention, by appending meta-data to the end of conventional directory data, meta-data can be registered in directory data without affecting existing applications.

Moreover, in the present invention, meta-data can be extracted from directory data recording meta-data and provided for processing such as searching, reference, change, etc. Accordingly, by using a typical data writing language to write the meta-data, existing tools for that data writing language can be used, thus facilitating the development of compatible applications.

In addition, in the present invention, registering meta-data in a directory can facilitate meta-data, and can help reduce data quantities. Consequently, when, for example, searching binary data for a given item included in the meta-data, only the directories need be searched, and the search can be performed rapidly. Further, to change a value in a given item included in the meta-data, it is not necessary to change meta-data for each binary file; the meta-data for all binary files in a given directory can be changed by changing only the meta-data attached to the directory data. Consequently, meta-data can be changed rapidly. Moreover, since meta-data common to a plurality of binary files belonging to a given directory can be managed as a single meta-data, data quantity can be reduced.

Third Embodiment

The first and second embodiments above discussed registration of meta-data in directory data. If meta-data is registered in directory data, it becomes unnecessary to attach meta-data to each file in the directory, and it is also easier to change the contents of the meta-data. However, if files are moved or copied from the directory, the meta-data registered in the directory may be lost, thus wasting the meta-data registered in the directory. In the present third embodiment, in order to resolve the foregoing problem, when binary data belonging to a directory is copied or moved outside the directory, meta-data is registered in that binary data. Here, a data processing device according to the present third embodiment is equivalent to that of the first embodiment (FIG. 1), and accordingly explanation thereof will be omitted here.

Figure 9:
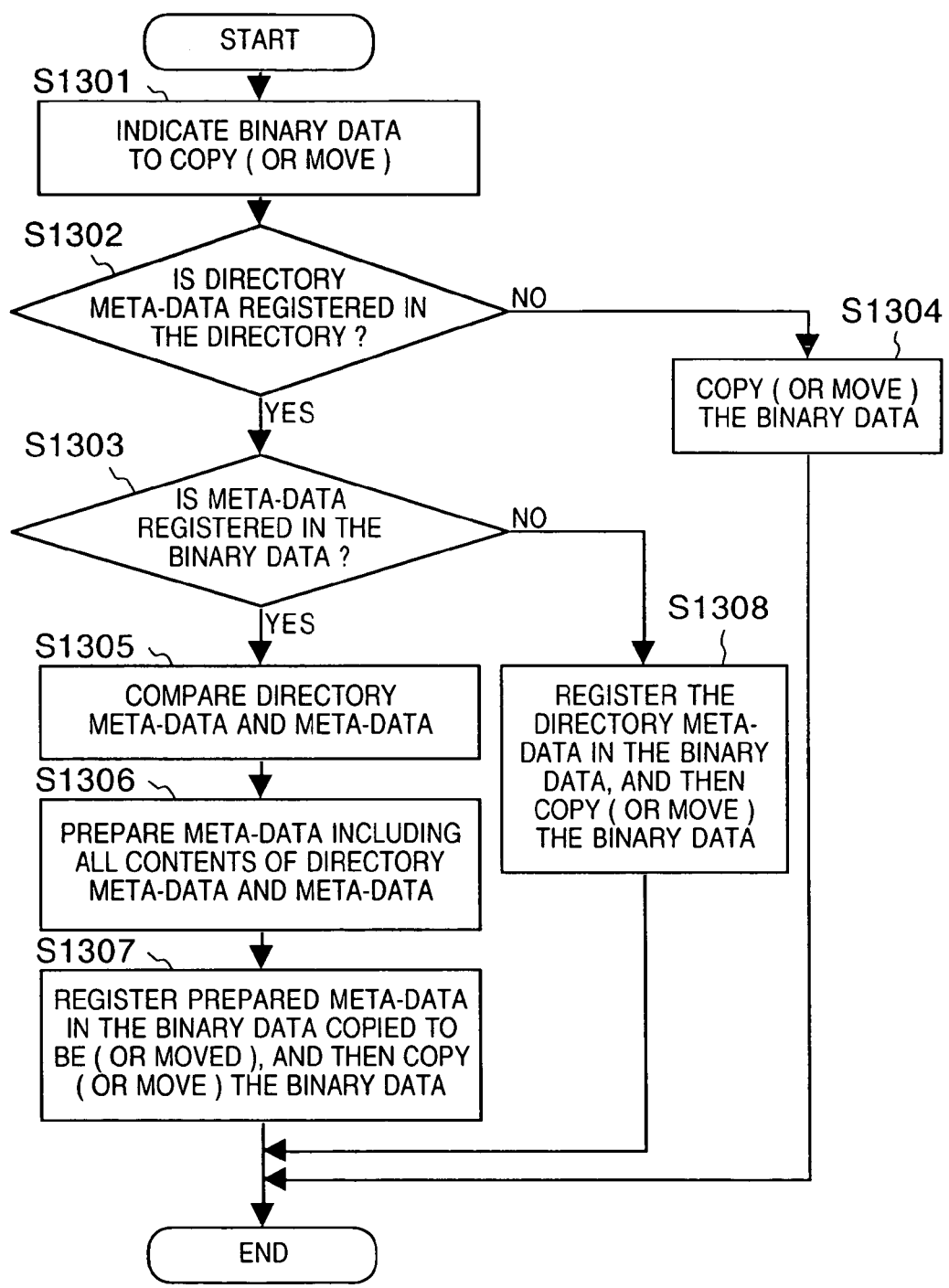
FIG. 9 is a flow chart showing a method of registering meta-data in binary data according to a third embodiment of the present invention.

A method of registering meta-data in binary data according to the present third embodiment will now be explained with reference to the flow chart in FIG. 9. In the flow chart in FIG. 9, when binary data belonging to a directory is copied or moved outside the directory, meta-data is registered in that binary data.

First, in step S1301, a user indicates a binary data file in the directory to be copied or moved to another directory. The processing to be discussed below is performed on the copy of the binary data (not on the original binary data) when the operation is copying, and on the binary data after being moved, when the operation is moving. Next, in step S1302, it is determined whether the directory to which the indicated file belongs registers directory meta-data like that explained in the first and second embodiments above. This determination of whether or not directory meta-data is registered in the directory is performed as was explained above with reference to FIGS. 5 and 6.

If the result of the determination in step S1302 is that there is directory meta-data registered in the directory, processing proceeds to step S1303, and if there is no directory meta-data, processing proceeds to step S1304. In step S1304, since there is no meta-data registered in the directory, the indicated binary data is copied (or moved).

Figure 10:
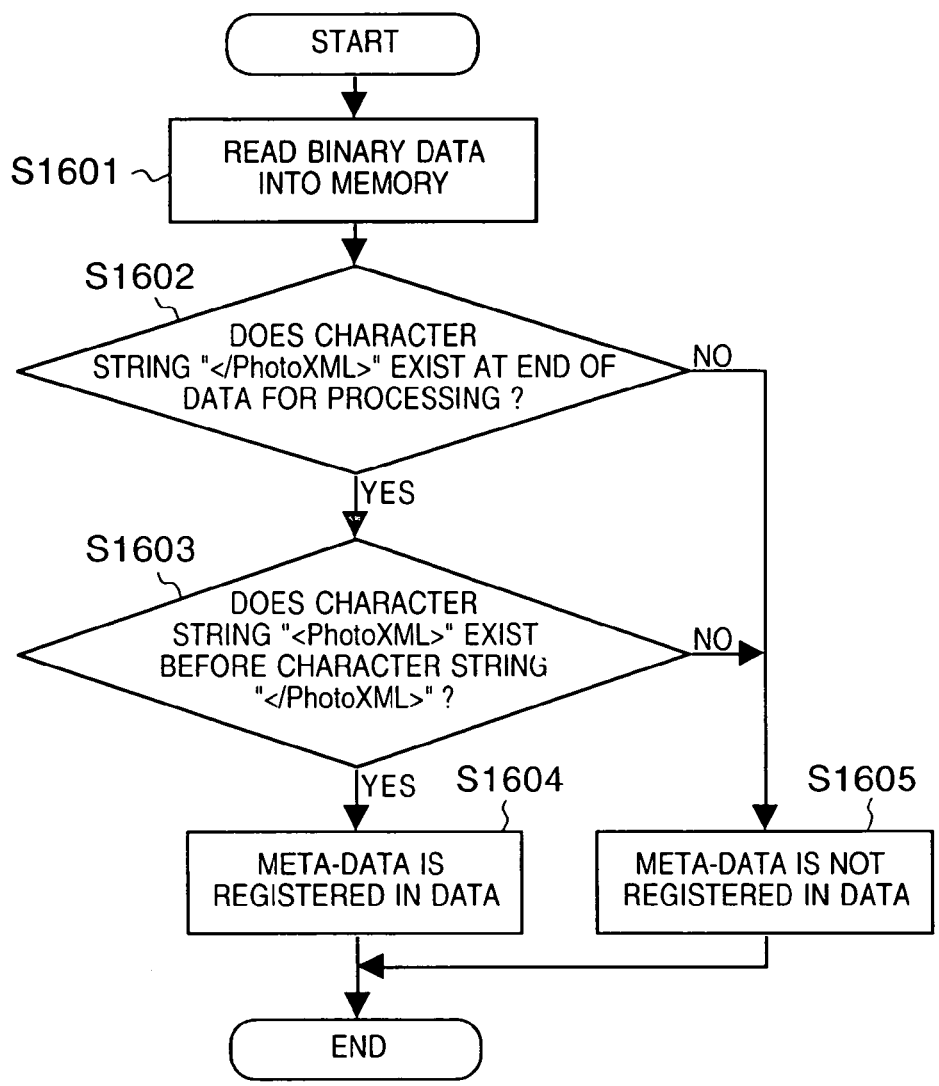
FIG. 10 is a flow chart explaining a method of determining whether meta-data is registered in binary data according to the third embodiment.

When, on the other hand, there is directory meta-data, it is determined in step S1303 whether there is meta-data registered in the binary data indicated in step S1301. Processing for determining whether meta-data is registered in the binary data will be explained with reference to FIGS. 10 and 11. FIG. 10 is a flow chart showing processing for determining whether meta-data is registered in the binary data, and FIG. 11 is a drawing explaining registering of meta-data in binary data according to the present embodiment.

Figure 11:
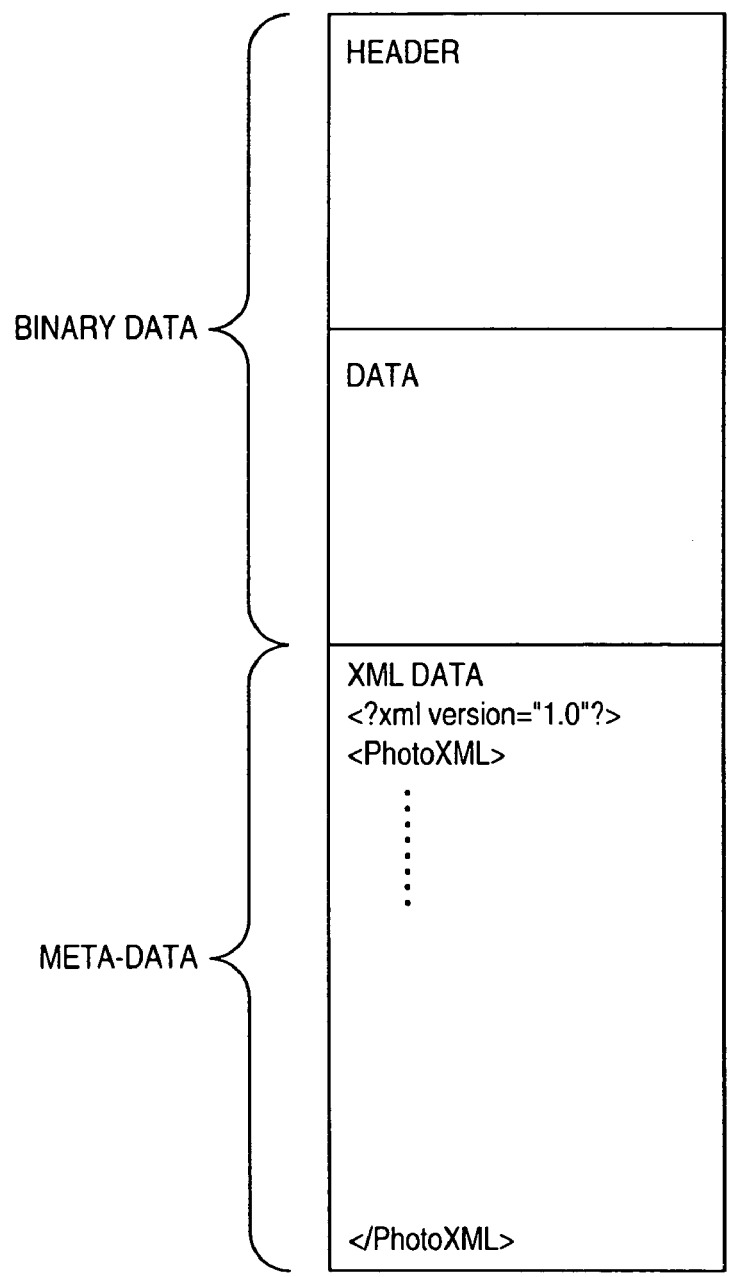
FIG. 11 is a drawing showing an example of data structure of binary data with meta-data registered therein according to the third embodiment.

Binary data with meta-data registered therein is made up of the parts shown in FIG. 11. Accordingly, in order to distinguish the presence or absence of meta-data, in FIG. 5, first, in step S1601, the entirety of the indicated binary data is read into memory. Next, in step S1602, it is checked whether the character string "</PhotoXML>" is present at the end of the binary data read into memory. If this character string is present, processing proceeds to step S1603, where it is checked whether a character string "<PhotoXML>" is present before the character string "</PhotoXML>". If this character string is also present, processing proceeds to step S1604, where it is concluded that meta-data is registered in the binary data.

On the other hand, if it is judged in step S1602 that the character string "</PhotoXML>" is not present, or if it is judged in step S1603 that the character string "<PhotoXML>" is not present, then processing proceeds to step S1605, where it is concluded that no meta-data is registered in the binary data.

If it is determined by the foregoing determination processing that there is no meta-data registered in the binary data, processing proceeds to step S1308. When processing has proceeded to step S1308, it means that directory meta-data is registered in the directory, but no meta-data is registered in the binary data. Accordingly, the directory meta-data is registered in the binary data, the binary data is copied (or moved), and processing ends. Here, meta-data is registered in the binary data by the same method as that for registering meta-data in directory data explained in the first embodiment above. In other words, data having the form shown in FIG. 11 is generated by appending the meta-data to the end of the binary data.

If, on the other hand, it was determined in step S1303 that meta-data is registered in the binary data, processing proceeds to step S1305. In step S1305, the directory meta-data registered in the directory and the meta-data registered in the binary data are compared. Then, in step S1306, meta-data is prepared which, as a result of the comparison in step S1305, includes all of the directory meta-data and binary data meta-data.

Here, processing for generating the meta-data in step S1306 will be explained in detail. As shown in FIG. 12, directory meta-data 1801 and meta-data 1802 are combined to create meta-data 1803, which includes all the contents of both meta-data.

The meta-data prepared as above is then newly registered in the binary data, which is then copied (or moved), and processing ends.

As discussed above, in the present embodiment, when copying or moving binary data belonging to a directory, directory meta-data registered in the directory is registered in the binary data as meta-data, and thus even if some of the files in a directory are moved elsewhere, the meta-data is not lost.

Further, even when meta-data is already registered in the binary data, this meta-data can be synthesized with the directory meta-data, and thus meta-data combining the directory meta-data and the meta-data can be registered in the binary data.

As is clear from the foregoing explanation of the present embodiment, in the present invention, directory meta-data written in the same data writing language as the directory data is registered in the binary data, and thus it is possible to copy or move the binary data while preserving the directory meta-data information. In addition, since the meta-data is written in a data writing language, existing tools for that data writing language can be used as is, thus saving the effort of developing new tools.

Fourth Embodiment

In cases when binary data already has meta-data, the present fourth embodiment enables registering of suitable meta-data in directory data. Here, a data processing device according to the present fourth embodiment is equivalent to that of the first embodiment (FIG. 1), and accordingly explanation thereof will be omitted here. A method of generating suitable meta-data from binary data in a directory will now be explained with reference to the flow chart in FIG. 13.

Figure 13:
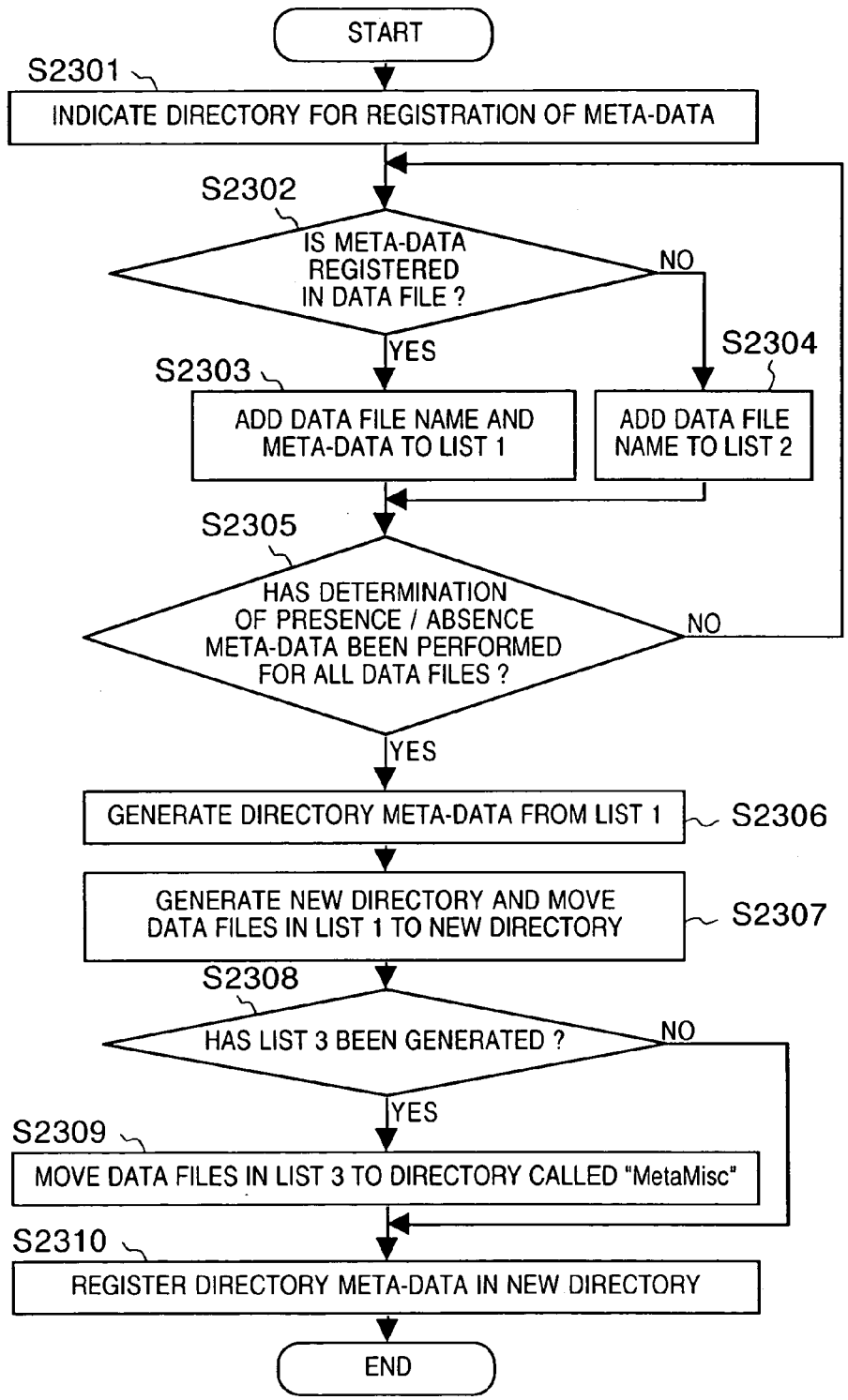
FIG. 13 is a flow chart showing a method of registering automatically generated directory meta-data in directory data according to a fourth embodiment of the present invention.

In FIG. 13, first, in step S2301, the user indicates a desired directory (a directory for which meta-data is to be generated and to which the meta-data is to be attached). Then, in step S2302, one of the data files in that directory is selected, and it is determined whether or not meta-data is registered in that file. The steps for distinguishing the presence or absence of meta-data are as explained above with reference to FIGS. 10 and 11.

Figure 14:
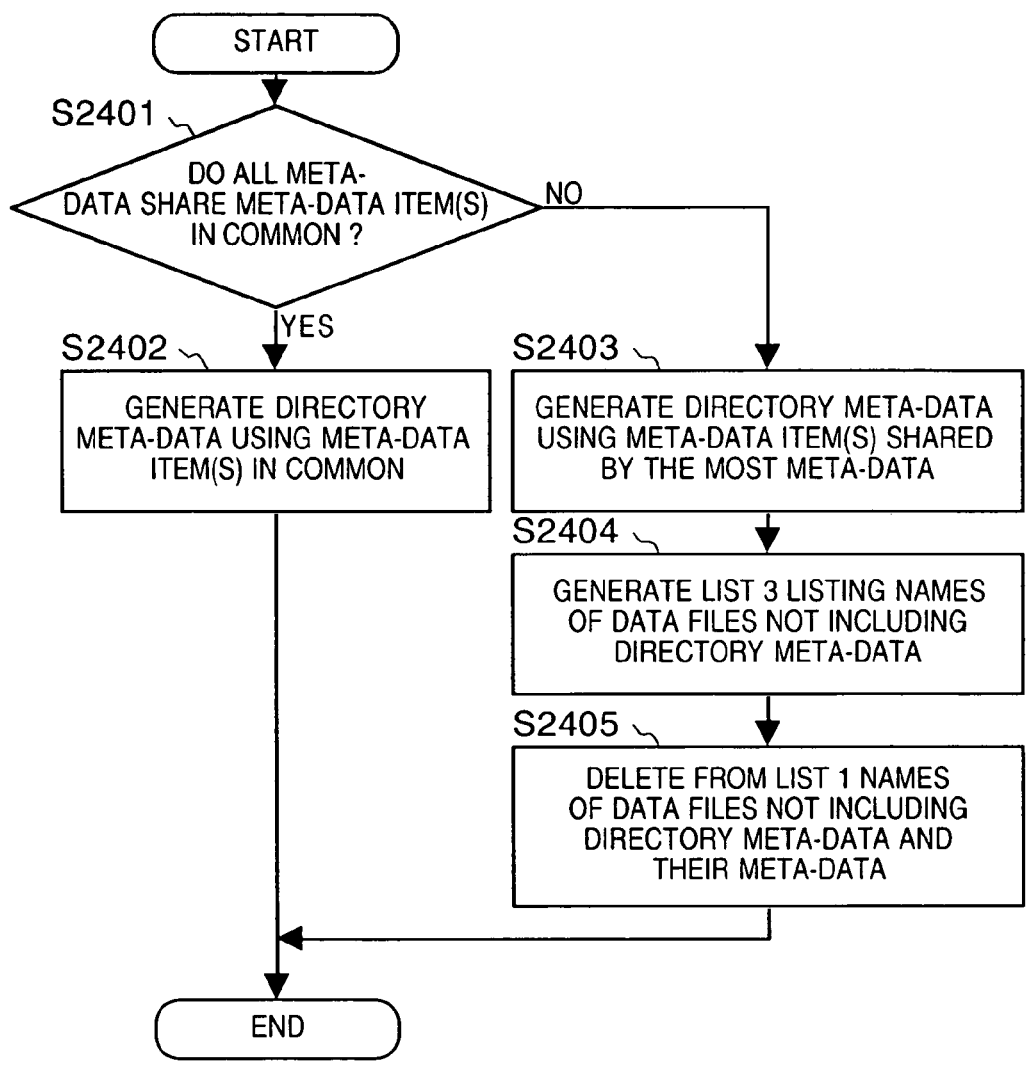
FIG. 14 is a flow chart showing a method of automatically generating directory meta-data according to the fourth embodiment.
Figure 16:
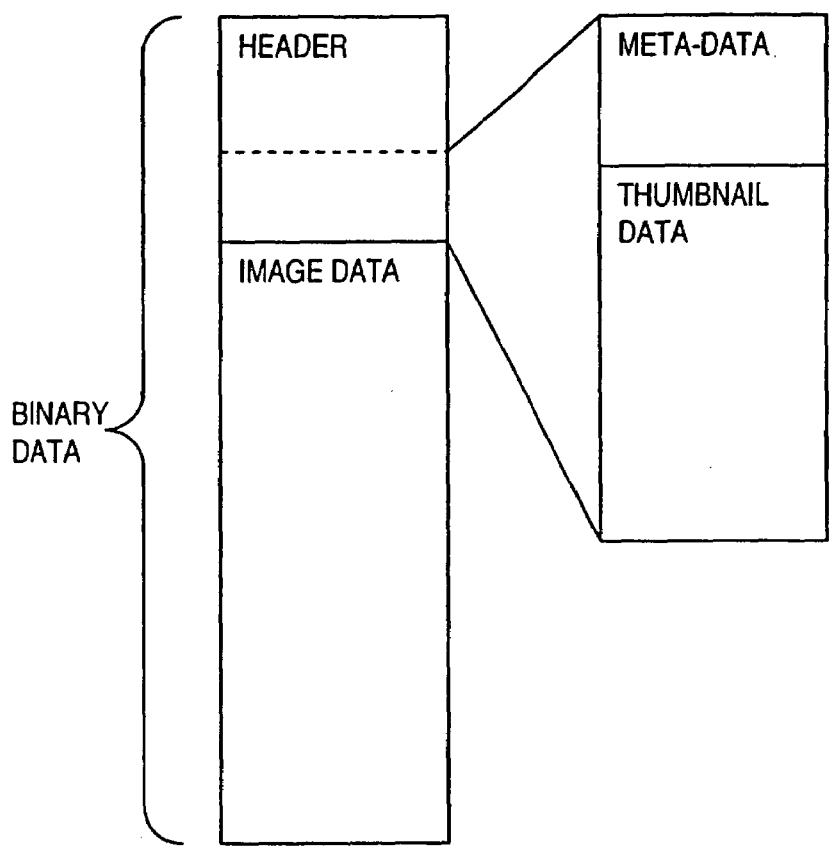
FIG. 16 is a drawing schematically showing a format which incorporates meta-data into binary data.
Figure 17:
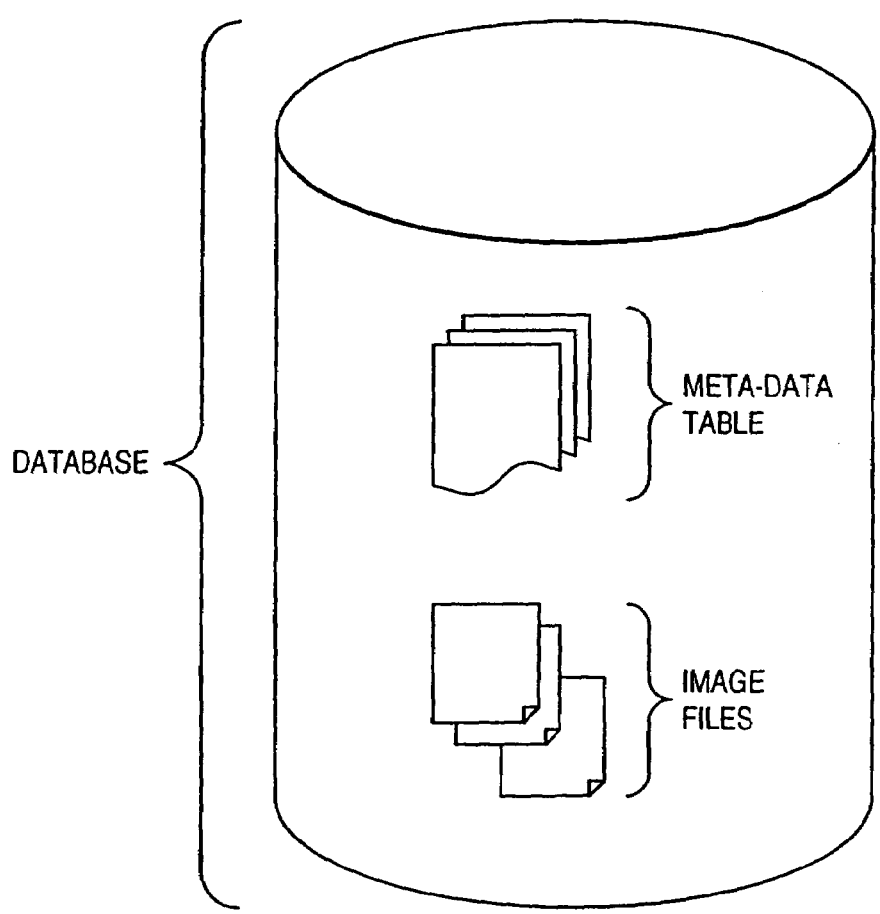
FIG. 17 is a drawing schematically showing a method for managing binary data and meta-data in a database.

When there is meta-data registered in the binary data, processing proceeds to step S2303, where the file name of the binary data registering meta-data, and the meta-data are added to a list 1 in memory. On the other hand, if in step S2302 there was no meta-data registered in the binary data, processing proceeds to step S2304. In step S2304, the file name of the binary data not registering meta-data is added to a list 2 in memory. The foregoing processing is executed for all of the files in the directory (step S2305). Next, in step S2306, directory meta-data is generated from list 1, which records the file names of binary data registering meta-data, and those meta-data. Processing for generating directory meta-data from list 1 will be explained below with reference to FIGS. 14 and 15. FIG. 14 is a flow chart explaining steps for generating directory meta-data in step S2306, and FIG. 15 is a drawing explaining generation of directory meta-data in step S2306.

In step S2401, it is checked whether all of the meta-data recorded in list 1 share one or more meta-data item(s) in common. Here, if all of the meta-data have one or more meta-data item(s) in common, processing proceeds to step S2404, where the meta-data item(s) in common is/are extracted, directory meta-data is generated using the extracted meta-data item(s), and processing ends. This processing will now be explained with reference to FIG. 15. From list 1 (501), it can be seen that meta-data is attached to the three image files img001.jpg, img002.jpg, and img003.jpg (filenames are the character strings bracketed by <Filename> and </Filename>, and meta-data are the data bracketed by <PhotoXML> and </PhotoXML>). Extracting the meta-data items shared by the three data files listed in list 1 (501) and generating directory meta-data therefrom yields the directory meta-data (502).

If, in step S2401, there were no meta-data items shared by all of the meta-data, processing proceeds to step S2403, where directory meta-data is generated using the meta-data item(s) shared by the most meta-data. Then, in step S2404, a list 3 is generated, which lists the names of data files registering meta-data which does not include the meta-data item(s) included in the directory meta-data. Then, in step S2405, the file names listed in list 3 and their meta-data are deleted from list 1.

Then, returning to FIG. 13, in step S2307, a new directory is generated, and all of the data files recorded in list 1 are moved to this new directory. Incidentally, in step S2307, the new directory is given a suitable name taken from the directory meta-data. Next, in step S2308, it is determined whether list 3 has been generated; if it has been generated, processing proceeds to step S2309, but if not, step S2309 is skipped. In step S2309, the data files recorded in list 3 are moved to a directory named "MetaMisc." Finally, in step S2310, directory meta-data is registered in the new directory generated in step S2307, and processing ends. Here, the method of registering the meta-data in the new directory is as explained in the first embodiment above, and has a data structure like that shown in FIG. 6.

The foregoing processing makes it possible to automatically generate directory meta-data from the data files in the directory, and to register this meta-data in the directory. As discussed above, in the present embodiment, directory meta-data can be automatically generated from data files in a directory, thus making it easy to register directory meta-data in the directory. Even when there are no meta-data items in common, by automatically generating directory meta-data from the binary data files in the "MetaMisc" directory, new directories and directory meta-data therefor can be repeatedly generated automatically.

Incidentally, in the present embodiment, when all of the data files in the indicated directory are listed in list 1 (i.e., when all of the data files in the directory register meta-data, and all of the meta-data share one or more meta-data item(s) in common), the meta-data generated may be registered in the directory data of the indicated directory, without generating a new directory.

As is clear from the foregoing explanation of the fourth embodiment, the present invention makes it possible to automatically generate directory meta-data from binary data. Further, attaching meta-data to the directory enables high-speed searching. Moreover, since the meta-data is written in an existing data writing language, existing tools for that data writing language can be used as is, thus saving the trouble of developing new tools.

Incidentally, in each of the foregoing embodiments, the meta-data was XML data, but there is no limitation to this. For example, it may be written in a data writing language such as SGML or HTML. Further, the data of the files in each directory may be binary data such as still image data, dynamic image data, or audio data, or any other form of data.

The present invention may be applied to a system made up of a plurality of devices (such as host computer, interface device, reader, printer, etc.), or to a single device (such as a copy machine, facsimile, etc.).

Further, the objects of the present invention may of course also be attained by supplying a system or a device with a memory medium recording the program code of software for realizing the functions of the foregoing embodiments, and using a computer (or CPU or MPU) of the device or system to read out and execute the program code stored in the memory medium.

In such a case, the program code itself, read out from the memory medium, realizes the functions of the embodiments discussed above, and the memory medium recording that program code structures the present invention.

The memory medium for supplying the program code may be a floppy disk, hard disk, optical disk, magneto-optical disk, CD-ROM, CD-R, magnetic tape, non-volatile memory card, ROM, etc.

In addition, it goes without saying that the scope of the present invention covers not only a case in which the functions of the foregoing embodiments are realized by executing the program code read out by a computer, but also a case in which, based on the instructions of the program code, an OS (operating system) operating in the computer performs part or all of the actual processing, and this processing realizes the functions of the foregoing embodiments.

Furthermore, it goes without saying that the scope of the present invention also covers a case in which the program code read out from the memory medium is written into the memory of an expansion board or expansion unit inserted into or connected to the computer, and, based on the instructions of the program code, a CPU, etc. of the expansion board or expansion unit performs part or all of the actual processing, and this processing realizes the functions of the foregoing embodiments.

As many apparently widely different embodiments of the present invention can be made without departing from the spirit and scope thereof, it is to be understood that the invention is not limited to the specific embodiments thereof except as defined in the claims.

What is claimed is:

1. A computer-implemented data processing method comprising the steps of:

reading multiple types of meta-data from data files belonging to a first directory, each of the data files having both content data and meta-data formed by text data to indicate characteristics of the content data;

extracting common text data forming common meta-data from the multiple types of meta-data included in the data files read in said reading step;

first generating step for generating a second directory for the data files using the extracted common metadata;

second generating step for generating directory meta-data for the second directory by using the common text data extracted in said extracting step;

registering the directory meta-data generated in said second generating step to the second directory; and third generating step for generating a third directory for data files to which are attached meta-data which does not include the common text data used in the directory meta-data.

2. The method set forth in claim 1, wherein:

when in said searching step there is no common text data, the directory meta-data for the second directory is generated based on text data forming meta-data included in most of the data files belonging to the second directory.

3. The method set forth in claim 1, wherein:
each data file includes image data, audio data, or dynamic image data.

4. The method set forth in claim 1, wherein:
in said registering step, the directory meta-data generated in said second generating step is appended to the end of the second directory data.

5. A data processing device comprising:
means for reading multiple types of meta-data from data files belonging to a first directory, each of the data files having both content data and meta-data formed by text data to indicate characteristics the content data;
means for extracting common text data forming common meta-data, from the multiple types of meta-data included in the data files;
means for generating a second directory for the data files using the extracted common metadata, and generating directory meta-data for the second directory by using the common text data extracted by said extracting means;
means for registering the directory meta-data to the second directory; and
means for generating a third directory for data files to which are attached meta-data which does not include the common text data used in the directory meta-data.

6. The device set forth in claim 5, wherein when said means for extracting finds no common text data, said means for generating a second directory generates the directory meta-data based on text data forming meta-data included in most of the data files belonging to the new directory.

7. The device set forth in claim 5, wherein:
each data file includes image data, audio data, or dynamic image data.

8. The device set forth in claim 5, wherein:
said means for registering appends the new directory meta-data generated by said generating means to the end of the second directory data.

9. A computer-readable memory medium storing a control program to be executed by a computer, said control program comprising code for performing the steps of:
reading multiple types of meta-data from data files belonging to a first directory, each of the data files having both content data and meta-data formed by text data to indicate characteristics of the content data;
extracting common text data forming common meta-data included in the data files, from the multiple types of meta-data;
a first generating step for generating a second directory for the data files using the extracted common metadata;
a second generating step for generating directory meta-data for the second directory by using the common text data in said extracting step;
registering the new meta-data to the second directory; and
a third generating step for generating a third directory for data files to which are attached meta-data which does not include the common text data used in the directory meta-data.

10. A data processing device comprising:
a reading unit adapted to read multiple types of meta-data from data files, each of the data files having both content data and meta-data formed by text data to indicate characteristics of the content data; and
a processing unit adapted to extract common text data from multiple types of meta-data included in the data files, to generate a second directory for the data files using the extracted common metadata, and directory meta-data for the second directory by using the extracted common text data, to register the generated directory meta-data to the second directory, and to generate a third directory for data files to which are attached meta-data which does not include the common text data used in the new directory meta-data.

* * * * *

UNITED STATES PATENT AND TRADEMARK OFFICE
CERTIFICATE OF CORRECTION

| | |
|---|---|
| PATENT NO. | : 7,127,472 B1 |
| APPLICATION NO. | : 09/558656 |
| DATED | : October 24, 2006 |
| INVENTOR(S) | : Miyuki Enokida et al. |

It is certified that error appears in the above-identified patent and that said Letters Patent is hereby corrected as shown below:

COLUMN 4:
Line 66, "Instep S304," should read -- In step S304, --.

COLUMN 10:
Line 55, "S2305). Next," should read --S2305. ¶ Next, --.

Signed and Sealed this

Twenty-ninth Day of May, 2007

JON W. DUDAS
*Director of the United States Patent and Trademark Office*